US008871371B2

(12) United States Patent
Song

(10) Patent No.: US 8,871,371 B2
(45) Date of Patent: Oct. 28, 2014

(54) BATTERY MODULE

(75) Inventor: Young-Bae Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 428 days.

(21) Appl. No.: 12/838,704

(22) Filed: Jul. 19, 2010

(65) Prior Publication Data

US 2011/0091759 A1    Apr. 21, 2011

(30) Foreign Application Priority Data

Oct. 16, 2009    (KR) .................. 10-2009-0098891

(51) Int. Cl.
- H01M 10/50 (2006.01)
- H01M 10/6554 (2014.01)
- H01M 10/615 (2014.01)
- H01M 10/6557 (2014.01)
- H01M 10/613 (2014.01)
- H01M 10/6567 (2014.01)
- H01M 10/643 (2014.01)

(52) U.S. Cl.
CPC ...... H01M 10/5004 (2013.01); H01M 10/5053 (2013.01); H01M 10/5006 (2013.01); H01M 10/5059 (2013.01); Y02E 60/12 (2013.01); H01M 10/503 (2013.01); H01M 10/5075 (2013.01)
USPC ...................................... 429/120

(58) Field of Classification Search
USPC ........................................ 429/120
See application file for complete search history.

(56) References Cited

U.S. PATENT DOCUMENTS

| 6,422,027 | B1 * | 7/2002 | Coates et al. ............... 62/259.2 |
| 2002/0177035 | A1 * | 11/2002 | Oweis et al. ................ 429/120 |
| 2006/0216583 | A1 | 9/2006 | Lee et al. |
| 2009/0169978 | A1 * | 7/2009 | Smith et al. .................. 429/82 |

FOREIGN PATENT DOCUMENTS

| JP | 11-301285 | 11/1999 |
| JP | 11301285 A | * 11/1999 ............... B60K 1/04 |
| JP | 2000-348781 | 12/2000 |
| JP | 2003-234093 | 8/2003 |
| JP | 2003-234131 | 8/2003 |
| KR | 10-2007-0014658 | 2/2007 |
| KR | 10-2008-0030215 | 4/2008 |

OTHER PUBLICATIONS

KIPO Office action dated Jul. 20, 2011, for Korean priority Patent application 10-2009-0098891, 4 pages.
Patent Abstracts of Japan, and English machine translaiton of Japanese publication 11-301285, 6 pages.

(Continued)

*Primary Examiner* — Karie O'Neill Apicella
(74) *Attorney, Agent, or Firm* — Christie, Parker & Hale, LLP

(57) ABSTRACT

A battery module that has improved cooling efficiency includes a plurality of rechargeable batteries and a cooling wall that is installed between the rechargeable batteries to cool the rechargeable batteries, wherein the cooling wall includes first wall bodies that are connected in a first direction and second wall bodies that are connected in a second direction intersecting the first direction, flow paths in which a coolant moves are formed within the first wall bodies and the second wall bodies, and the flow path of the first wall bodies is communicated via the flow path of the second wall bodies.

10 Claims, 5 Drawing Sheets

(56) References Cited

OTHER PUBLICATIONS

Patent Abstracts of Japan, and English machine translaiton of Japanese publication 2003-234093, 6 pages.

KIPO Notice of Allowance dated Nov. 21, 2011, for Korean priority Patent application 10-2009-0098891, 5 pages.

Patent Abstracts of Japan, and English machine translation of Japanese Publication 2003-234131, 5 pages.

* cited by examiner

BATTERY MODULE

CROSS-REFERENCE TO RELATED APPLICATION

This application claims the benefit of Korean Application No. 10-2009-0098891, filed Oct. 16, 2009 in the Korean Intellectual Property Office, the disclosure of which is incorporated herein by reference.

BACKGROUND

1. Field

The described technology relates generally to a battery module that is formed by connecting a plurality of rechargeable batteries. More particularly, the described technology relates generally to a battery module having an improved cooling structure.

2. Description of the Related Art

A rechargeable battery can be repeatedly charged and discharged, unlike a primary battery that cannot be charged. A low capacity rechargeable battery constituting a cell is generally used for a small portable electronic device such as a mobile phone, a laptop computer, and a camcorder. A large capacity rechargeable battery has a plurality of cells which are connected in a pack form. The large capacity rechargeable battery is widely used as a power source for driving a motor of a hybrid electric vehicle, etc.

The large capacity rechargeable battery is manufactured in various shapes, and typical shapes thereof are a cylindrical shape and a square shape. The rechargeable batteries are coupled in series to drive a motor of a hybrid electric vehicle, etc., that need a large amount of electric power, to form a large capacity battery module. In this case, as a battery module is formed by connecting several to several tens of rechargeable batteries, the battery module should be able to easily emit heat that is generated in each rechargeable battery.

When heat is not appropriately emitted, a temperature deviation occurs between the rechargeable batteries. Therefore, the battery module cannot output the electric power necessary for driving a motor to a desired degree. For instance, when the temperature inside the battery rises due to the heat that is generated in the rechargeable battery, an abnormal reaction occurs therein. Thus, the life-span of the rechargeable battery is shortened. Moreover, when the temperature continues to rise, the rechargeable battery may ignite or explode. Additionally, because the conductivity of ions is lowered at a low temperature, the output performance of the battery module is deteriorated when the temperature is too low.

The above information disclosed in this Background section is only for enhancement of understanding of the background of the described technology and therefore it may contain information that does not form the prior art that is already known in this country to a person of ordinary skill in the art.

SUMMARY

Aspects of the invention provide a battery module having advantages of an improved temperature adjustment function.

An exemplary embodiment of the present invention provides a battery module including a plurality of rechargeable batteries and a cooling wall that is installed between the rechargeable batteries to cool the rechargeable batteries, wherein the cooling wall includes a plurality of first wall bodies that are connected in a first direction and a plurality of second wall bodies that are connected in a second direction intersecting the first direction, flow paths in which a coolant moves formed within the first wall bodies and the second wall bodies, and the flow path of the first wall bodies is communicated via the flow path of the second wall bodies.

According to an aspect of the invention, the battery module may further include a circulation pump that transfers the coolant, and both ends of the first wall bodies may be alternately connected by the second wall bodies.

According to an aspect of the invention, the rechargeable batteries may be arranged in a plurality of battery columns, surfaces of the first wall bodies may be connected along the battery columns, and surfaces of the second wall bodies may be disposed at the end of the battery columns.

According to an aspect of the invention, the flow path may be connected in a length direction of the cooling wall, and the cooling wall may be formed in a lattice form.

According to an aspect of the invention, the battery module may further include a heating base that has a groove for inserting the rechargeable batteries and that heats the rechargeable batteries, and a heat line may be inserted into a heating barrier that partitions a groove of the heating base. The cooling wall may be installed on the heating barrier.

According to an aspect of the invention, the rechargeable battery may be formed in a cylindrical shape, and the coolant may include cooling water.

Another embodiment of the present invention provides a battery module including a plurality of rechargeable batteries, and a heating base that has a groove for inserting a lower end of the rechargeable batteries and in which a heat line is inserted into the inside thereof. A heat line may be inserted into a heating barrier that partitions a groove of the heating base.

According to an exemplary embodiment of the present invention, by supplying a coolant through a cooling wall, rechargeable batteries can be effectively cooled.

According to an exemplary embodiment of the present invention, because cooling water having a high specific heat can be used as a coolant, cooling efficiency can be maximized.

Further, according to an exemplary embodiment of the present invention, in a low temperature environment, charge and discharge efficiency of the rechargeable battery can be prevented from being deteriorated.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
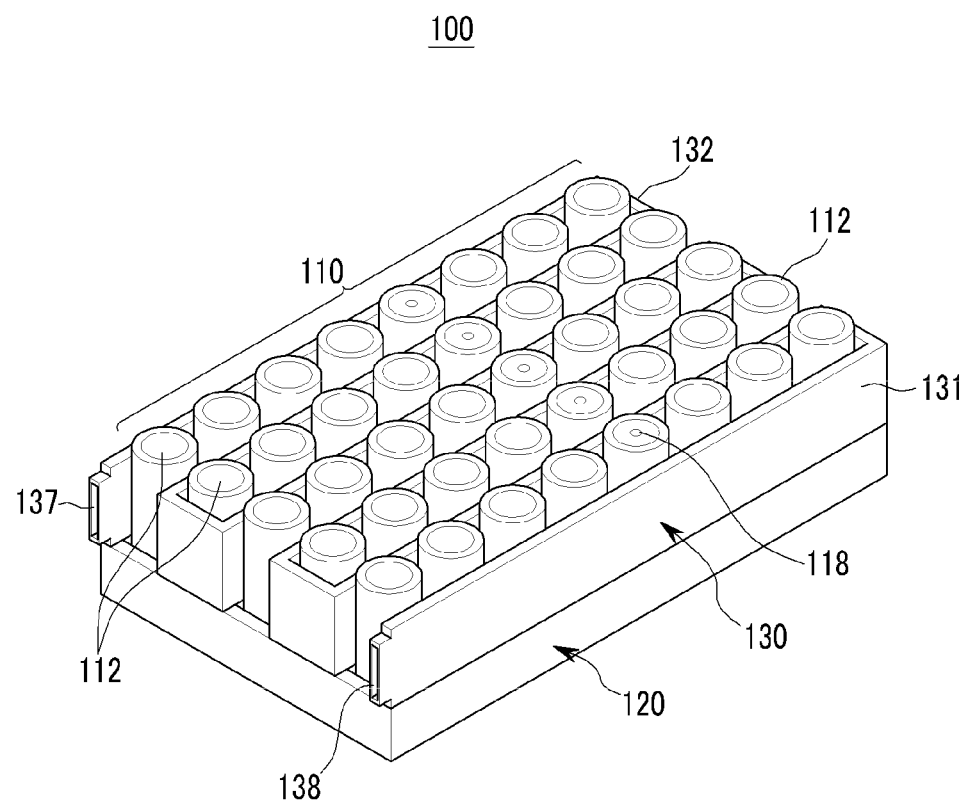
FIG. 1 is a perspective view illustrating a battery module according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
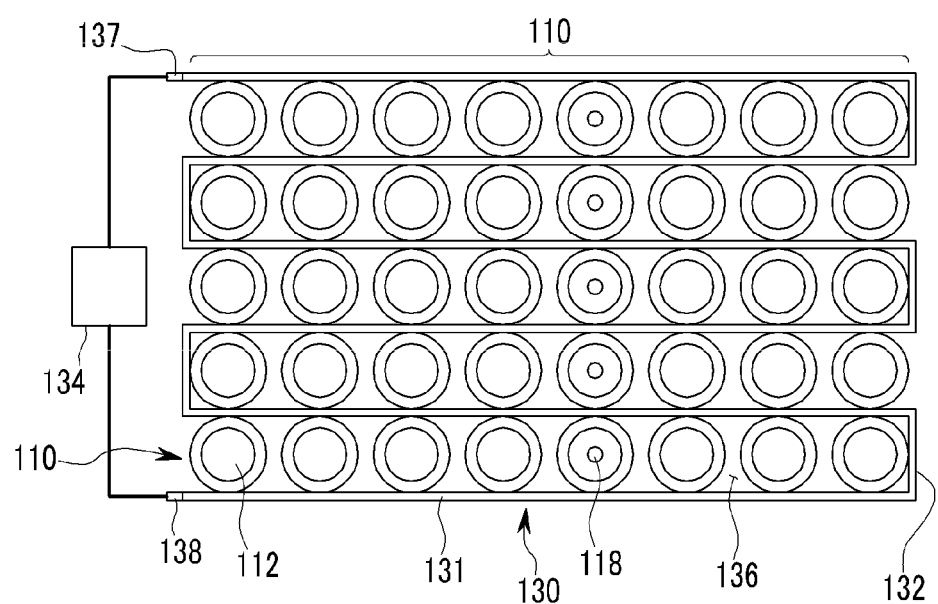
FIG. 2 is a top plan view illustrating a cooling wall and rechargeable batteries of the battery module according to an exemplary embodiment of the present invention.

FIG. 1 is a perspective view illustrating a battery module 100 according to an embodiment of the present invention. FIG. 2 is a top plan view illustrating a cooling wall 130 and rechargeable batteries 112 of the battery module 100. The battery module 100 includes a plurality of the rechargeable batteries 112, a heating base 120, and a cooling wall 130. The heating base 120 houses and heats the rechargeable batteries 112. The cooling wall 130 contacts and cools the rechargeable batteries 112. It is understood that both the heating base 120 and the cooling wall 130 need not be used in all aspects, such as where the batteries 112 are not exposed to low temperatures such that the heating base 120 is not needed or where the batteries 112 are in a very cold environment such that the cooling wall 130 is not needed. It is further understood that the heating base 120 and the cooling wall 130 could be combined into a single unit, such as where the cooling wall 130 has heating lines 125 therein or heated liquids, engine exhausts, etc. flow through the flow path 135. Alternately or in addition, the heating base 120 could have a flow path therein through which the coolant and/or heated liquids, engine exhausts, etc. flow in addition to or instead of the heating lines 125.

In the shown example, each rechargeable battery 112 is formed in a cylindrical shape. However, the present invention is not limited thereto, and the rechargeable battery 112 can be formed in a square shape, a pouch shape, or other shapes, and the shapes do not have to be the same in the module 100.

A plurality of the rechargeable batteries 112 are arranged to form a plurality of battery columns 110. The cooling wall 130 supports and cools the rechargeable batteries 112 and is installed between adjacent pairs of the battery columns 110. The cooling wall 130 includes a plurality of first wall bodies 131 and a plurality of second wall bodies 132. The plurality of first wall bodies 131 are connected in a first direction. The plurality of second wall bodies 132 extend and in a second direction intersecting the first direction so as to connect the first wall bodies 131 and form the wall 130 in a zig-zag pattern. In the present exemplary embodiment, the first direction and the second direction are orthogonal. However, the present invention is not limited thereto, and the first direction and the second direction may be formed to intersect without necessarily being orthogonal.

The first wall bodies 131 are formed along and substantially parallel to the battery columns 110. The second wall bodies 132 alternately connect end portions of the first wall bodies 131. Accordingly, the first wall bodies 131 and the second wall bodies 132 are connected in one path having the zig-zag pattern.

The first wall bodies 131 are disposed substantially parallel to the battery columns 110 between the battery columns 110 as well as at the outermost sides of the battery columns 110. The second wall bodies 132 are disposed at alternating ends of the battery columns 110. One first wall body 131 is installed to contact the rechargeable batteries 112 constituting one battery column 110, and one second wall body 132 is installed to contact the rechargeable battery 112 that is disposed at the outermost end of the battery column 110. Accordingly, the rechargeable batteries 112 are positioned at a space between the first wall bodies 131.

Figure 3:
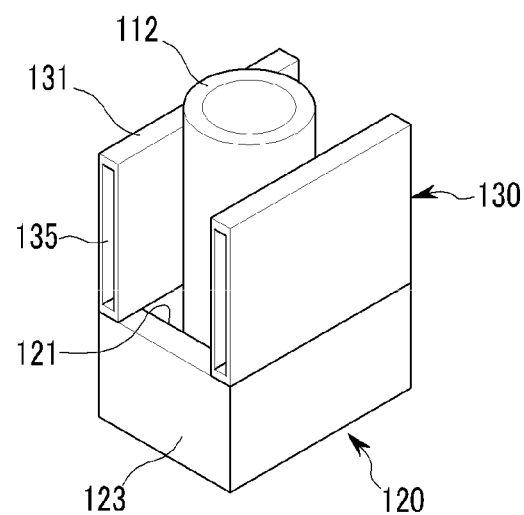
FIG. 3 is a cut-away perspective view illustrating some of the battery module according to an exemplary embodiment of the present invention.

As shown in FIG. 3, the cooling wall 130 has a flow path 135 in which a coolant moves within the cooling wall 130. The flow path 135 of the first wall bodies 131 connects with the flow path 135 of the second wall bodies 132. The flow path 135 is formed in a length direction of the cooling wall 130. Thus, the entire flow path 135 is formed by connecting the flow paths 135 within the first wall bodies 131 and the second wall bodies 132 to become as one passage.

A flow path inlet 137 is at one end of the flow path 135. The flow path inlet 137 injects the coolant into the flow path 135. A flow path outlet 138 is at the other end of the flow path 135 and discharges the coolant from the flow path 135. The flow path inlet 137 and the flow path outlet 138 communicate with a circulation pump 134. The circulation pump 134 performs a function of adjusting the flow quantity and the flow velocity of the coolant that is injected into the flow path 135 via the flow path inlet 137. Further, at the cooling wall 130, a heat exchanger (not shown) may be further installed to remove heat from the heated coolant.

A temperature sensor 118 is installed at the rechargeable batteries 112. By adjusting the flow quantity and the flow speed of the coolant based on information that is transferred through the temperature sensor 118, the rechargeable batteries 112 are sustained at a predetermined temperature. Such adjustments can be done manually or using a controller which adjusts the pump 134 according to the detected temperature. The controller could be a mechanical controller and/or a processor implementing a method encoded as software and/or firmware on a computer readable medium.

The coolant that is injected to the flow path inlet 137 cools the rechargeable batteries 112 while alternately passing through the first wall bodies 131 and the second wall bodies 132 and is discharged out of the flow path 135 via the flow path outlet 138. The flow path inlet 137 and the flow path outlet 138 of the cooling wall 130 are connected by the flow path 135, and because the flow path 135 is opened only at the flow path inlet 137 and the flow path outlet 138, a liquid can be used as the coolant. However, it is understood that gases can also be used as the coolant.

When a liquid is used as the coolant, the liquid has a specific heat that higher than that of a gas. Thus, even if heat that is generated in the rechargeable batteries 112 is fully absorbed, the temperature of coolant does not increase greatly. Therefore, the rechargeable batteries 112 can be uniformly cooled. Further, because the cooling wall 130 in which coolant flows to the inside thereof directly contacts the rechargeable batteries 112, heat generated in the rechargeable batteries 112 can be easily moved to the coolant through the cooling wall 130. While not required, the coolant can be cooling water.

When the flow path 135 of a closed structure is formed, as in the present exemplary embodiment, a uniform amount of coolant can be supplied to each of the rechargeable batteries 112. However, for the rechargeable batteries 112 that are installed at the rear side of the flow path 135 nearer the flow path outlet 138, there is a drawback in that when the coolant is supplied to the rear side, the coolant has already cooled the front side of the module 100 and thus already has absorbed heat. However, because the liquid having a high specific heat is used as the coolant, a temperature change of the coolant is not large, thereby performing uniform cooling.

Figure 4:
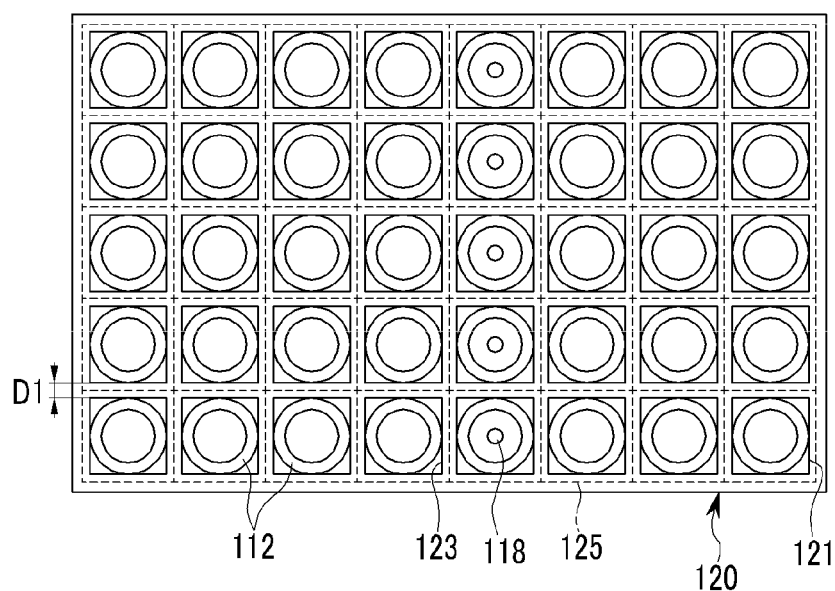
FIG. 4 is a top plan view illustrating a heating base and rechargeable batteries of the battery module according to an exemplary embodiment of the present invention.

FIG. 4 is a top plan view illustrating the heating base 120 and rechargeable batteries 112 of the battery module 100.

Referring to FIGS. 3 and 4, the heating base 120 houses a heat line 125 and is installed at the bottom of the battery module 100. A plurality of grooves 121 are formed at the heating base 120. Each groove 121 is formed by a heating barrier 123 that protrudes above the heating base 120. The heating barrier 123 is formed in a lattice structure, and the grooves 121 are formed between the heating barriers 123. The heating barrier 123 performs a function of separating the rechargeable batteries 112. A gap D1 between the rechargeable batteries 112 is formed with a size of 1.0 mm to 20 mm. If the gap D1 between the rechargeable batteries 112 is smaller than 1.0 mm, when the temperature of the rechargeable battery 112 rises to 800° C. to 900° C., there is a problem that neighboring rechargeable batteries 112 consecutively explode. If the gap D1 between the rechargeable batteries 112 is larger than 20 mm, there is a problem that a great deal of time is required for transferring heat from the heat line 125 to the rechargeable battery 112.

The rechargeable batteries 112 are inserted into the grooves 121 to be mounted on the heating base 120. In the shown example, the rechargeable batteries 112 are installed on the heating base 120 while forming the plurality of battery columns 110.

The heat line 125 is provided within the heating barrier 123 to heat the rechargeable batteries 112 at a low temperature. At a low temperature, ions within the rechargeable battery 112 do not appropriately move and thus the charge and discharge efficiency is lowered. Particularly, when the battery module 100 is installed in a vehicle, or when the battery module 100 is used for an electric power storage device that is installed outside, charge and discharge efficiency is lowered at a temperature of below zero in the winter season. However, when the rechargeable batteries 112 are installed on the heating base 120, as in the present exemplary embodiment, the rechargeable batteries 112 are easily heated through the heating base 120 and thus charge and discharge efficiency is prevented from being deteriorated at a low temperature. The heat line 125 can be an electrical line with heating elements or an electrical resistance which can supply the heat using energy provided from an external source or the batteries 112. However, it is understood that other non-electrical sources, such as heated liquids, engine exhausts, etc., can be used to generate heat by passing through heat line 125. Further, it is understood that elements of the heating line 125 can be disposed other than at the heating barrier 123, such as at a bottom of each groove 121 to directly heat a bottom of each rechargeable battery 112.

Figure 5:
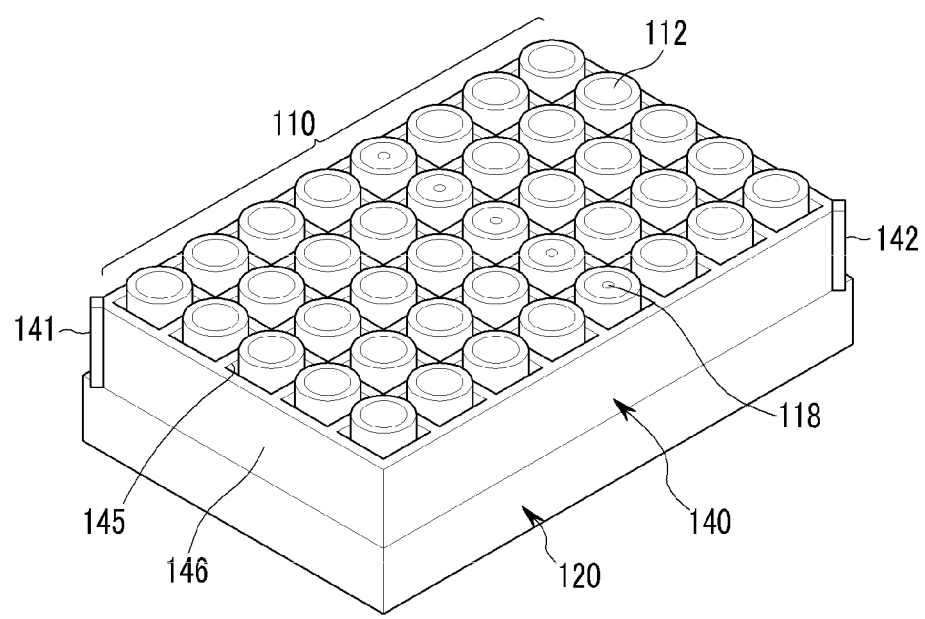
FIG. 5 is a perspective view illustrating a battery module according to an exemplary embodiment of the present invention.

FIG. 5 is a perspective view illustrating a battery module 200 according to an exemplary embodiment of the present invention. Referring to FIG. 5, the battery module 200 has the same structure as that of the battery module 100, except for a structure of a cooling wall 140. Therefore, a detailed description of the remaining elements will be omitted.

The battery module 200 includes the rechargeable batteries 112, the cooling wall 140 that cools the rechargeable batteries 112, and the heating base 120 that heats the rechargeable batteries 112. The cooling wall 140 includes a plurality of first and second wall bodies 145, 146. The first wall bodies 145 are connected in the first direction. The second wall bodies 146 are connected in the second direction. A flow path in which a coolant moves in a length direction is formed within the first wall bodies 145 and the second wall bodies 146. In the shown exemplary embodiment, the coolant is a liquid such as cooling water, but the invention is not limited thereto.

The rechargeable batteries 112 are arranged to form a plurality of battery columns 110 that are arranged in a line. The first wall bodies 145 are formed along the battery column 110. The second wall bodies 146 are formed to intersect the first wall bodies 145. In the shown embodiment, the first wall bodies 145 and the second wall bodies 146 orthogonally intersect, but the present invention is not limit thereto. The first wall bodies 145 and the second wall body 146 are connected to each other to form a lattice structure such that the first wall bodies 145 and the second wall bodies 146 intersect each other, and a plurality of second wall bodies 146 are connected to one first wall body 145.

A flow path inlet 141 is at one corner of the cooling wall 140. The flow path inlet 141 injects a coolant into the flow path. A flow path outlet 142 is formed at a corner diagonal to the one corner having the flow path inlet 141. The coolant that is injected into the cooling wall 140 through the flow path inlet 141 is diffused in various directions through the first wall bodies 145 and the second wall bodies 146. When the first wall bodies 145 and the second wall bodies 146 are connected in a lattice form, as in the present exemplary embodiment, a plurality of the second wall bodies 146 are connected to the first wall bodies 145 and thus the coolant moves in various directions to move more rapidly to the flow path outlet 142 through which the coolant exits the flow path. Accordingly, the cooling efficiency is further improved, thereby more uniformly cooling the rechargeable batteries 112.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery module comprising:
a plurality of rechargeable batteries;
a cooling wall located along and between the rechargeable batteries to cool the rechargeable batteries using a coolant, the cooling wall comprising a plurality of first wall bodies that extend generally in a first direction and a plurality of second wall bodies that extend generally in a second direction intersecting the first direction, each of the first wall bodies and the second wall bodies having a cavity therein through which the coolant is able to move, wherein the cavity of each of the first wall bodies is in communication with the cavity of at least one of the second wall bodies to form a single continuous flow path such that the coolant is able to move within the cooling wall using the flow path; and
a heating base comprising a heating barrier that defines grooves in the heating base, wherein each one of the grooves accommodates one of the rechargeable batteries, and a heat line within the heating barrier and spaced from each of the rechargeable batteries,
wherein:
inner ones of the first wall bodies are disposed between a pair of outer first wall bodies, and
both ends of the inner first wall bodies are alternately connected to adjacent first wall bodies by the second wall bodies.

2. The battery module of claim 1, further comprising a pump that transfers the coolant within the flow path.

3. The battery module of claim 1, wherein:
the rechargeable batteries are arranged in a plurality of battery columns having corresponding ends,
surfaces of the first wall bodies are connected along the battery columns, and
surfaces of the second wall bodies are disposed at the corresponding ends of the battery columns.

4. The battery module of claim 1, wherein the flow path extends along at least two sides of each of the rechargeable batteries.

5. The battery module of claim 1, wherein the cooling wall is formed in a lattice form.

6. The battery module of claim 1, wherein the cooling wall is on the heating barrier.

7. The battery module of claim 1, wherein each of the rechargeable batteries is formed in a cylindrical shape.

8. The battery module of claim 1, wherein the coolant comprises water.

9. The battery module of claim 1, wherein the cooling wall is formed in a zig zag shape.

10. The battery module of claim 1, wherein each adjacent pair of the first wall bodies is connected by only one of the second wall bodies.

* * * * *